United States Patent [19]

Yoshii

[11] 3,759,529

[45] Sept. 18, 1973

[54] MAGNETIC RECORDING AND REPRODUCING APPARATUS

[75] Inventor: Tetsuji Yoshii, Neyagawa-shi, Japan

[73] Assignee: Matsushita Electric Industrial Co., Ltd., Osaka, Japan

[22] Filed: Feb. 26, 1969

[21] Appl. No.: 802,455

[30] Foreign Application Priority Data

| | | |
|---|---|---|
| Mar. 6, 1968 | Japan | 43/14881 |
| July 31, 1968 | Japan | 43/66446 |
| July 31, 1968 | Japan | 43/66471 |
| July 30, 1968 | Japan | 43/66179 |
| Aug. 7, 1968 | Japan | 43/56605 |
| July 31, 1968 | Japan | 43/66445 |
| Apr. 3, 1968 | Japan | 43/22477 |
| July 11, 1968 | Japan | 43/49451 |
| Aug. 21, 1968 | Japan | 43/60298 |
| Mar. 14, 1968 | Japan | 43/16991 |
| Mar. 27, 1968 | Japan | 43/19923 |
| July 30, 1968 | Japan | 43/66178 |

[52] U.S. Cl. .................................. 274/4 C, 274/4 E
[51] Int. Cl. .......................................... G11b 23/04
[58] Field of Search .................. 274/4 E, 4 C, 11 C; 242/197–200; 179/100.2 Z

[56] References Cited

UNITED STATES PATENTS

| | | | |
|---|---|---|---|
| 3,226,478 | 12/1965 | Martin | 179/6 |
| 3,337,690 | 8/1967 | Martin | 179/6 |
| 3,085,758 | 4/1963 | Herrmann | 242/201 |
| 3,167,267 | 1/1965 | Crane | 274/11 C X |
| 3,285,610 | 11/1966 | Shields | 274/4 C |
| 3,310,638 | 3/1967 | Burton | 274/4 X |
| 3,394,898 | 7/1968 | Laa | 274/4 E UX |
| 3,417,938 | 12/1968 | Markakis | 274/4 E UX |
| 3,494,572 | 2/1970 | Uemura | 274/4 E UX |
| 3,495,835 | 2/1970 | Laa | 274/4 E |

FOREIGN PATENTS OR APPLICATIONS

| | | | |
|---|---|---|---|
| 1,223,160 | 0/1967 | Germany | 274/4 E |
| 951,483 | 0/1956 | Germany | 274/4 E |

*Primary Examiner*—Harry N. Haroian
*Attorney*—Stevens, Davis, Miller & Mosher

[57] ABSTRACT

A magnetic recording and reproducing apparatus having a cassette tape comprises head base controlling mechanism, and holding case and provides the following three functions: keeping a tape in contact with a recording and reproducing head and an erasing head to such a degree as not to cause trouble for detecting or erasing the recorded content during fast forwarding or rewinding speed of a tape by the reproducing or erasing head, making it possible to record and reproduce at a constant forwarding speed by advancing the head within the cassette, and also making it possible to mount or demount the cassette by completely withdrawing the head advanced within the cassette therefrom.

17 Claims, 19 Drawing Figures

INVENTOR
TETSUJI YOSHII

BY Stevens, Davis, Miller & Mosher
ATTORNEYS

INVENTOR

TETSUJI YOSHII

BY

ATTORNEY

INVENTOR
TETSUJI YOSHII

BY

ATTORNEY.

INVENTOR

TETSUJI YOSHII

BY

ATTORNEYS

INVENTOR
TETSUJI YOSHII

BY Stevens, Davis, Miller & Mosher
ATTORNEYS

INVENTOR
TETSUJI YOSHII

BY

ATTORNEYS

INVENTOR
TETSUJI YOSHII

BY

ATTORNEYS

INVENTOR
TETSUJI YOSHII

BY

ATTORNEYS

PATENTED SEP 18 1973

3,759,529

SHEET 09 OF 12

INVENTOR

TETSUJI YOSHII

BY

ATTORNEYS

INVENTOR
TETSUJI YOSHII

BY Stevens, Davis, Miller & Mosher

ATTORNEYS

INVENTOR
TETSUJI YOSHII

BY

ATTORNEYS

INVENTOR
TETSUJI YOSHII

BY

ATTORNEYS

MAGNETIC RECORDING AND REPRODUCING APPARATUS

The present invention relates to a magnetic recording and reproducing apparatus, and more particularly to a magnetic recording and reproducing apparatus having a tape of the magazine type or cassette type comprising a controlling mechanism of a head base, and the case holding the cassette.

Few examples have been presented heretofore of a dictation machine for recording and reproducing in which a cassette is used. In conventional tape of the open reel type, the tape is placed close to the fixed head by tape shifters for recording, reproducing, and erasing, it is also quickly wound forward and rewound when it is drawn away from the head, or quickly wound forward or rewound as it contacts with the head and disengages from the pad. For the tape of the cassette tape type, the head must be advanced into the cassette in order to run the tape within the cassette, thus resulting in a disadvantageously complicated structure.

The cassette of a conventional reproducing apparatus is manually mounted on and dismounted from a predetermined position for playing. In order to faciliate the mounting and dismounting of this cassette, means have been recently proposed and practised for first retaining the cassette in the cassette holding case and then rotating the cassette case into the playing position. However, these devices merely place the cassette in the holding case but fail to control the extent of insertion. Some of them can control the insertion but the controlling mechanism is too complicated. Others may fail to smoothly bring the cassette into a playing position because a friction is generated between the force urging the cassette forward and the guide pole against said force as the cassette is engaged or disengaged while the cassette is being brought to the playing position. There is another disadvantage in that the height of the heads does not coincide with that of the cassette.

An object of the present invention is to provide a magnetic recording and reproducing device in which a tape is kept in contact with a recording head or an erasing head to such a degree as not to cause trouble in the high-speed forwarding of a tape in order to effect the detection and erasure of the recorded content with a recording and reproducing head or an erasing head in the fast forwarding or rewinding speed, the recording and reproducing is made possible at a constant forwarding speed by advancing the head within the cassette, and the head advanced within the cassette can be completely taken out of the cassette to mount and demount the cassette.

A further object of the present invention is to provide a controlling device of the head base for controlling the position of the head in connection with an action by which the cassette holding case is pressed into playing position in order to advance the head within the cassette solely by one operation to set the cassette in the predetermined position for playing.

According to the present invention, the cassette holding case itself or the member connected operatingly thereto is engaged with the head base so that the said engagement is released by setting the cassette holding case in the playing position and, at the same time, the driving piece of the thus advanced head base locks and engages the operatingly connected member. Consequently, the cassette can be taken out only if the head is drawn back and completely removed from the cassette, thus providing the advantage that damages to the head because of wrong operation may be avoided. The handling and operation of the device is also simplified.

A still further object of the present invention is to provide a magnetic recording and reproducing device in which the cassette holding case is mounted on or demounted from the set easily in a simplified manner and accurately. In the mechanism for engaging the cassette with the cassette holding case and for disengaging thereof, an engaging mechanism for the cassette in the guiding portion of the cassette in the cassette holding case is particularly provided, whereby the cassette is engaged with the case and disengages when the cassette is brought into the playing position. When the cassette is taken out of the case, the cassette is automatically extracted from the case only if the locking engagement of the cassette holding case with the playing position is released.

Other objects, features, and advantages of the present invention will be readily apparent from the following description of certain preferred embodiments taken in conjunction with the accompanying drawings, in which.

Figure 12:
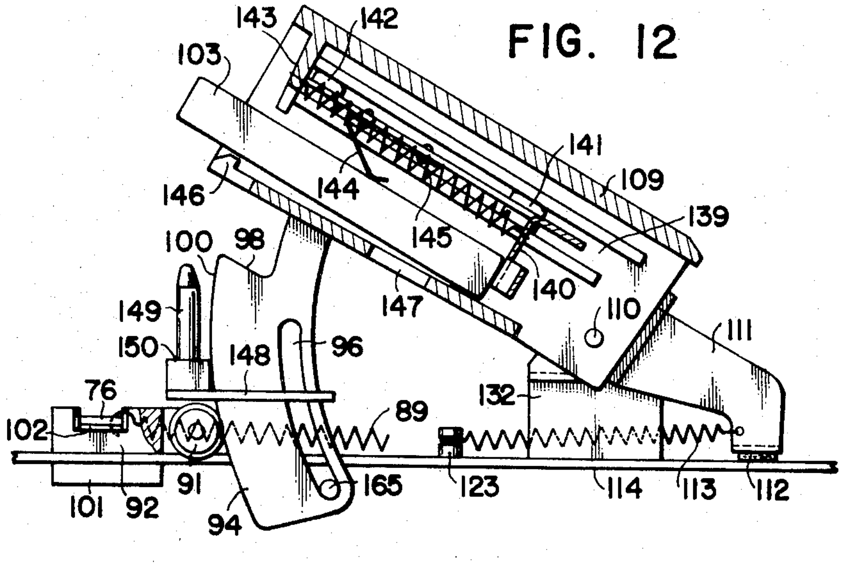
Figure 13:
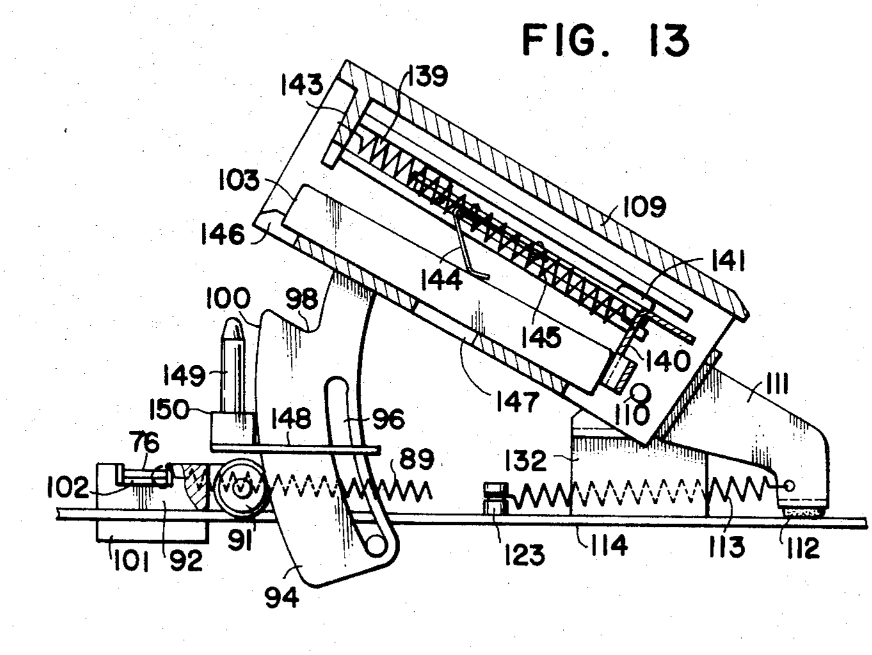
Figures 14, 15, 16:
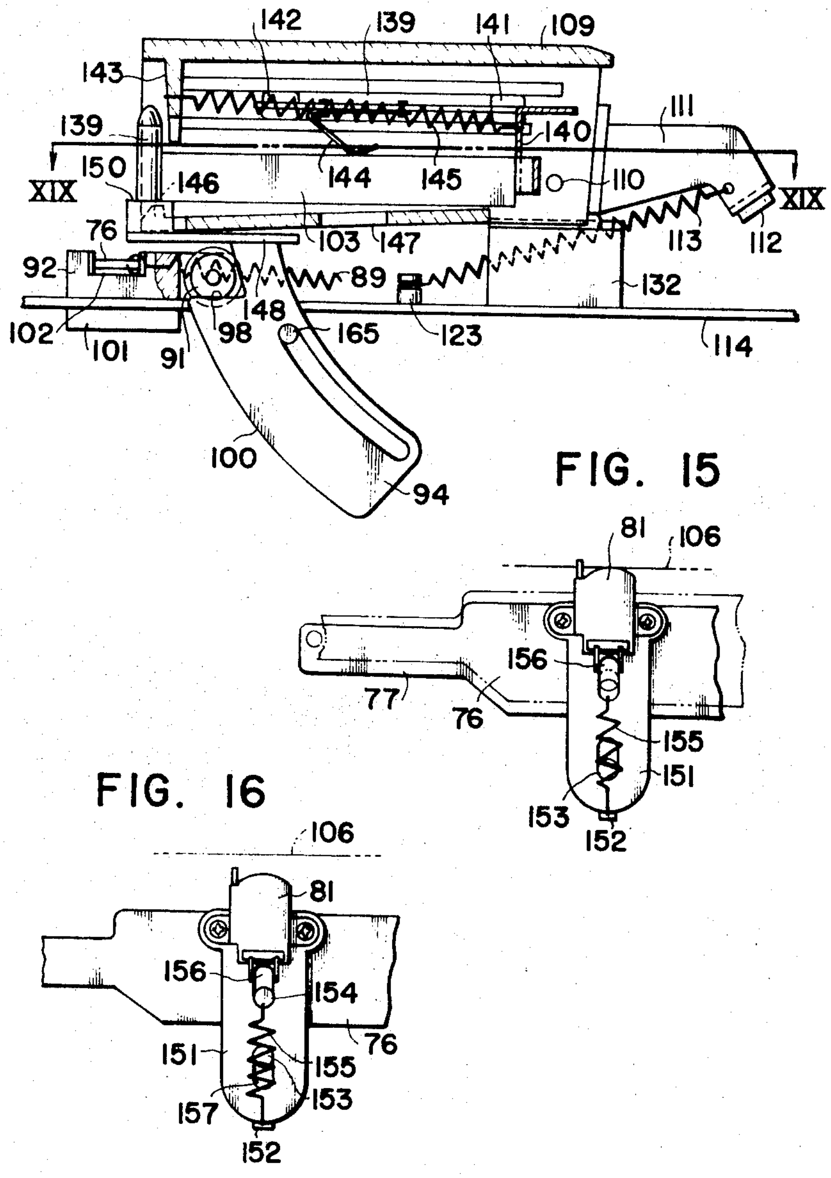
Figure 18:
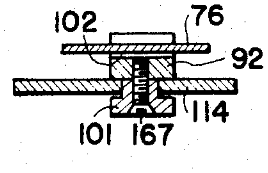
Figure 17:
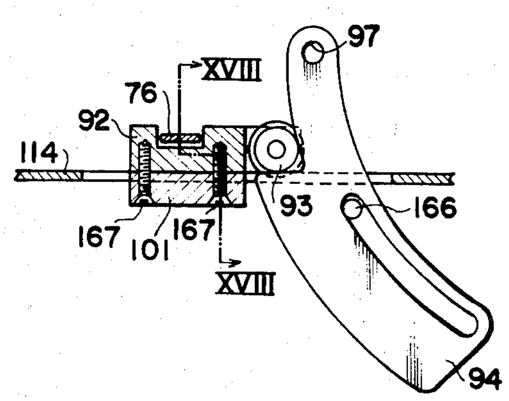
Figure 17:
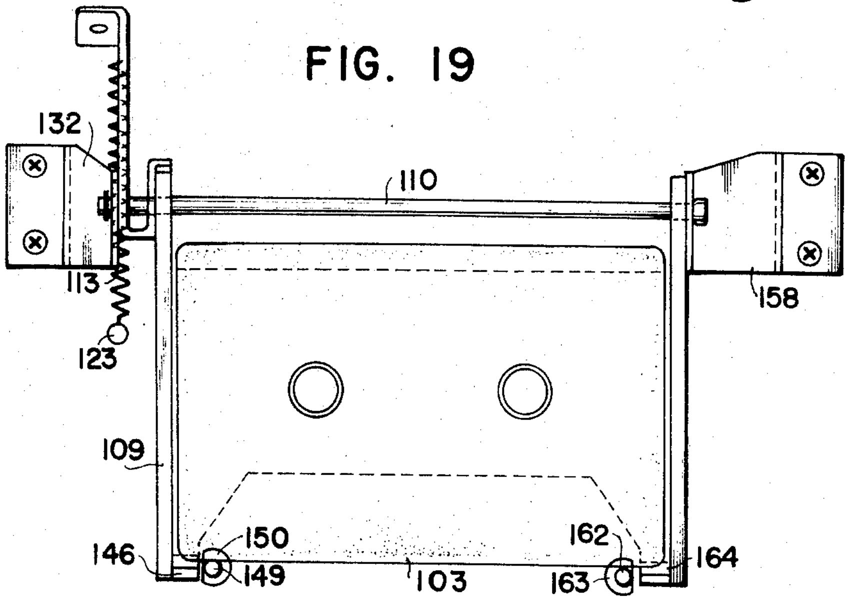

FIGS. 12, 13 and 14 are side views showing the mutual relation between the cassette and the cassette holding case, in which FIG. 12 illustrates the cassette extracted from the holding case in the condition that the cassette holding case is popped-up or the cassette is about to be inserted into the cassette holding case, FIG. 13 shows the cassette held in engagement with the cassette holding case after it has been inserted, and FIG. 14 shows that the engagement of the cassette is released when the cassette is brought from the holding position in the playing position, and the head base advances so that heads, pinch roller, etc., enter into the cassette as well as the cassette holding case is locked and engaged in the operatingly connected members thereof;

FIGS. 15 and 16 show other embodiments of the present invention concerning the shifting motion of the head base to three positions;

FIG. 17 is a cross-sectional view illustrating in detail the engagement of the driving piece of the head base plate with the controlling plate of the head base;

FIG. 18 is a cross-sectional of side view of the said engagement shown in FIG. 17; and FIG. 19 is a cross-sectional view taken along the line 19—19 of FIG. 14, and a plan view illustrating the mutual relation of the cassette holding case, cassette and guide pins.

Figure 1:
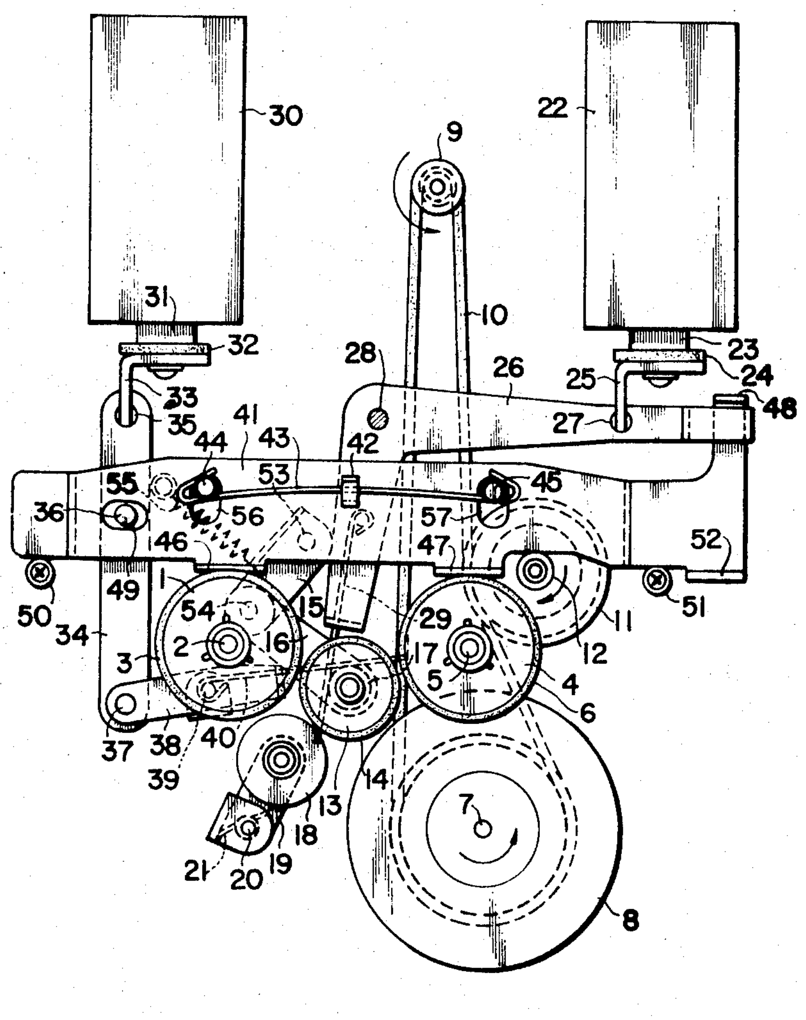
FIG. 1 is a plan view of the driving and braking mechanism of an embodiment of the present invention, showing the unplayed condition.

Referring to FIG. 1, reference numeral 1 indicates a supply reel base, 2 is the shaft for the supply reel base, 3 is a rubber tire fitted onto the exterior periphery of the supply reel, and the driving force or the braking force is applied to the periphery thereof. Reference numeral 4 indicates a takeup reel base, 5 is the shaft of the takeup reel base, and 6 a rubber tire fitted onto the exterior periphery of the takeup reel and functions in the same manner as mentioned above. Reference numeral 7 indicates a capstan, 8 is a flywheel for the capstan, 9 is a pulley connected directly to the shaft of a motor as a power source; 10 is a rubber belt. Reference numeral 11 is a pulley for transmitting the force to wind the tape on the takeup reel 4 when the tape is forwarded at a constant speed, receiving the driving force from the belt 10 to the pulley 11 and transmitting the said driving force to a pulley 12 with the aid of friction between the pulley 11 and the pulley 12. Reference numeral 13 indicates an intermediate idle pulley and fitted onto the periphery thereof a rubber tire 14, being borne swingably by a bearing 17 on an arm 16 by means of a shaft 53, provided on the base plate 114 (not shown in this Figure for the sake of clarity) an arm 15, and a shaft 54. Reference numeral 18 is a rewinding reel which is borne on an arm 19 rotating about a shaft 20 provided on the base plate and acts normally separated from the supply reel base 1. Reference numeral 22 indicates an electromagnet for fast forwarding of the tape, 23 is the plunger of the electromagnet 22, 24 is a rubber washer for reducing noise, 25 is a metal fixture for connection to engage with a hole 27 provided in the fast forwarding lever 26, rotating the fast forwarding lever about a shaft 28 by the operation of the electromagnet 22 so that the wire spring 29 provided on the other end acts on the bearing 17 of the intermediate idle pulley 13 to press the intermediate idle pulley 13 on the flywheel and the rubber tire 6 of the takeup reel base 4, thereby transmitting the torque carried by the flywheel 8 to the takeup reel base 4 as well as driving one end 48 of the brake arm 41 by one end of the fast forwarding lever 26 so as to release the contact of the brake 41 with reel bases 1 and 4 and permitting the fast forwarding motion.

Figure 2:
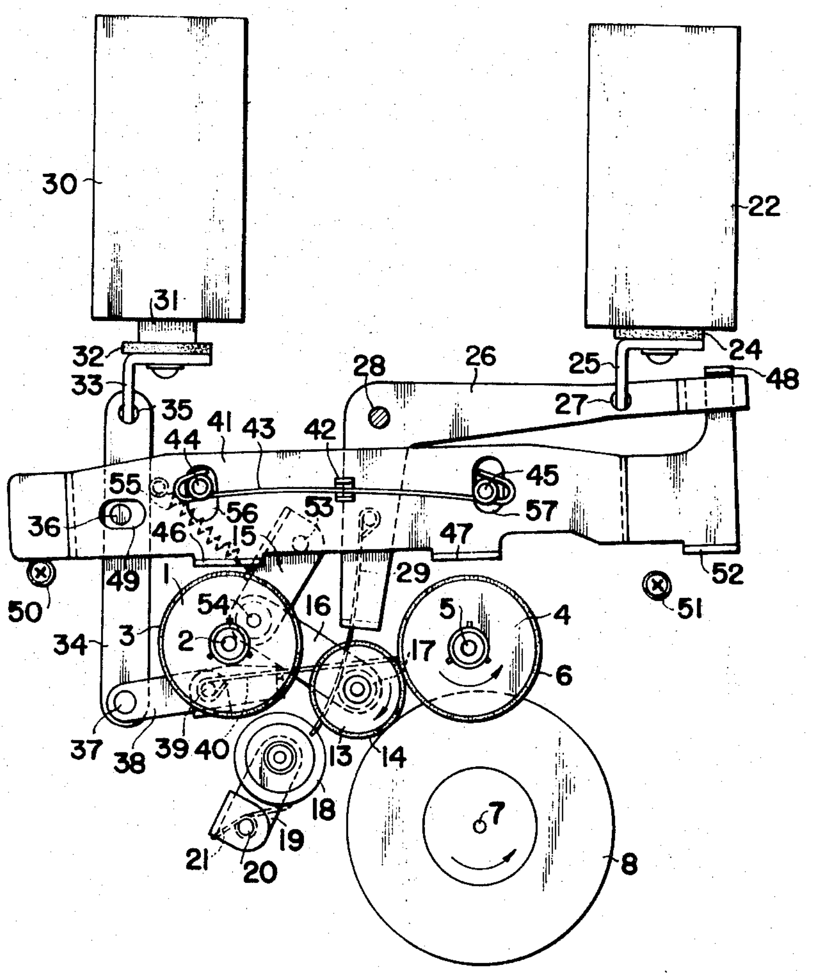
FIG. 2 shows a fast forwarding condition of the device shown in FIG. 1.
Figure 3:
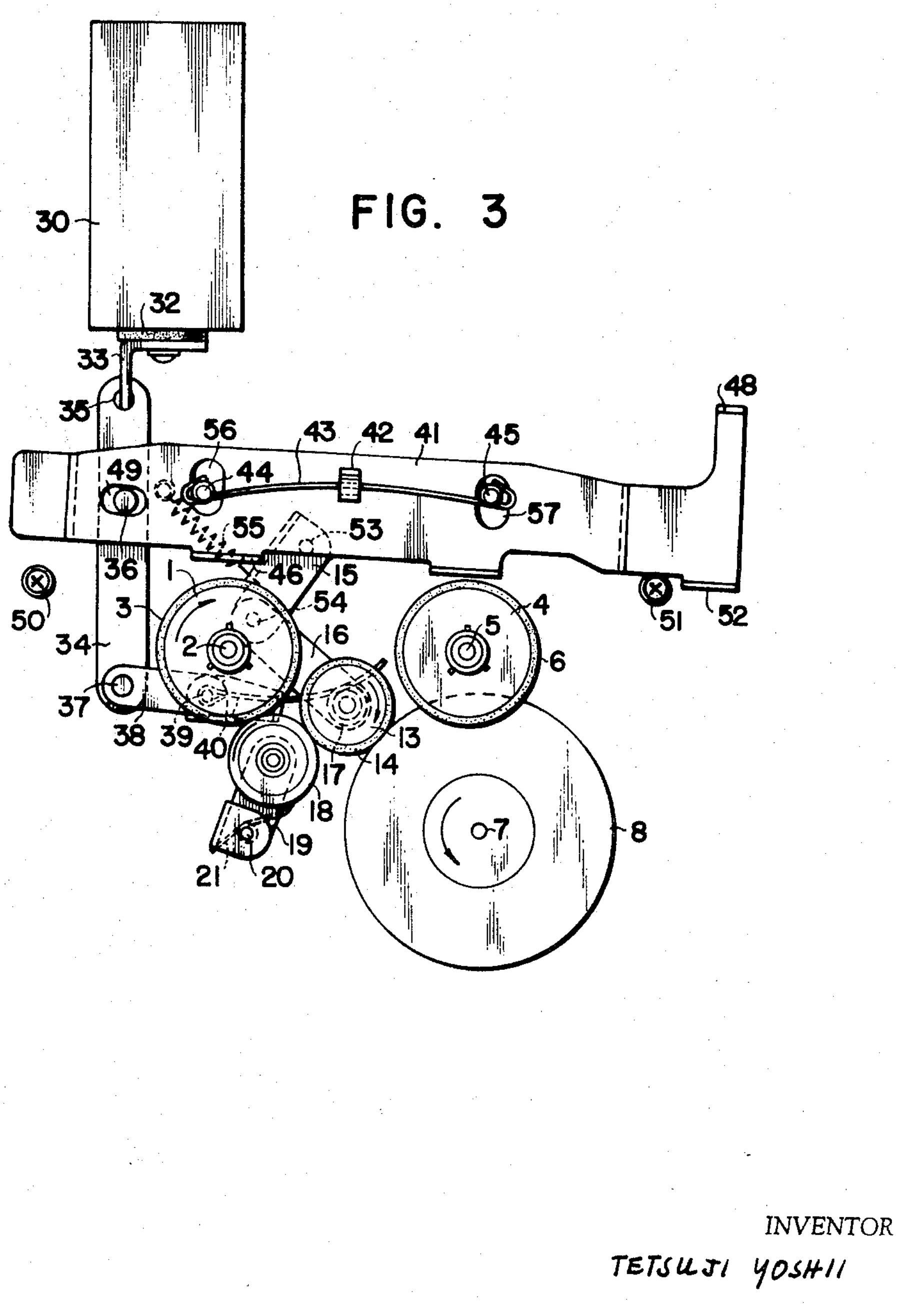
FIG. 3 shows a rewinding motion of the said device.

Reference numeral 30 indicates an electromagnet for rewinding, 31 is a plunger of the electromagnet 30, and 32 is a rubber washer for reducing noise, 33 is a metal fixture for connection engaging with the hole 35 of the rewinding rod 34 and drives a rewinding lever 38 through a connecting pin 37 by the operation of the electromagnet 30 to rotate the rewinding lever 38 about a shaft 39 provided on the base plate so that a wire spring 40 provided on the shaft 39 acts on the bearing 17 of the intermediate idle pulley so as to press the intermediate idle pulley 13 on the flywheel 8 and rewinding pulley 18 and then to press the rewinding pulley 18 against the supply reel base 1 by the said pressing force, thereby transmitting the torque carried by the flywheel 8 to the intermediate idle pulley 13, then to the rewinding pulley 18, and further to the supply reel base 1 as well as engaging a pin 36 provided on the rewinding rod 34 with the slot 49 of the brake arm 41 for driving to permit the rewinding motion for releasing the brake arm 41 from both reel bases 1 and 4 (FIG. 3). Reference numeral 42 indicates a projection provided on the brake arm 41 to support the middle portion of a compressive spring 43 of the brake arm 41 and supported at both ends thereof by winding around pins 44 and 45 controlling the rear height of the cassette mounted on the base plate 114 (shown in subsequent figures). Reference numeral 55 indicates a spring for restoring the intermediate idle pulley 13, which is guided by two wire springs 29 and 40 crossing each other, (to restore the intermediate idle pulley 13) toward the intersecting point of the two springs when not operated. Reference numerals 46 and 47 indicate brake shoes pressed against the periphery of the supply reel base 1 and the takeup reel base 4, respectively. Reference numerals 50 and 51 indicate stopper pins which are spaced from the brake arm 41 when the shoes 46 and 47 rest against reel bases 1 and 4, respectively. When the bending projection 48 at one end of the brake arm 41 is driven in the fast forward mode, the brake arm 41 rotates about a fulcrum at which the periphery of the rubber tire 3 of the supply reel base 1 contacts with the brake shoe 46 until it contacts with the stopper pin 50, then the brake shoe 47 contacting the takeup reel base 4 separates first, and it further rotates to release until the left-hand end of the brake arm 41 contacts with the stopper pin 50, since the brake arm 41 then rotates about the fulcrum where the brake arm 41 contacts with the stopper pin 50, the brake shoe 46 which has been in contact with the periphery of the supply reel base 1 starts to separate. There is thus produced a difference of timing in releasing the brake shoes 46 and 47, whereby fast forward operation is started smoothly (FIG. 2). When the apparatus is stopped, the above-mentioned order of operation is reversed. The brake arm 41 draws near to the side of the reel base while rotating about the stopper pin 50 as fulcrum so that the periphery of the supply reel base 1 contacts with the brake shoe 46, and subsequently the brake arm 41 rotates about the contacting point of the supply reel base periphery with the brake shoe 46 so that its contact with the stopper pin 50 is broken off and the takeup reel base 4 comes in contact with the brake shoe 47. In other words, when the fast forward motion is stopped, the supply reel base 1 is first braked and the takeup reel base 4 is next braked to provide a time interval between the two operations; consequently, the tape is stopped without any sag, whereby directional braking is possible. When the tape is rewound, the brake arm rotates about the right-hand stopper pin as a fulcrum so as to produce a time interval exactly the reverse of the fast forward operation, thus smoothly starting and stopping the tape when rewound (FIG. 3). Reference numerals 56 and 57 are slots provided on each brake arm 41 through which the pins 44 and 45 pass which control the rear height of the cassette and which serve as a guide when swinging the brake arm 41. In the drawings, the driving point and the stopper pin are provided separately; however, while one of two driving members drives, the other may be used as a stopper pin.

If the stopper pin of the brake arm is provided in the side of the reel base relative to the brake arm as shown in the drawing and if it is desired to first release the right-hand brake, or in the outside of the brake shoe and in the reverse side to the release driving point, then it is only necessary to provide the release driving point in the right side and the stopper pin in the outside of the left reel base. The stopper pin of the brake arm may be provided in the reverse side to the reel base relative to the brake arm. If the stopper pins is provided in the release driving side and in the outside of the driving point, a similar effect may be obtained.

In the above-stated manner, the driving mechanism as well as the braking device according to the present invention are small in size for a recording and reproducing device of the cassette type, and so it is not necessary any more to concentrate the driving parts in a small space of the device. The mechanism of the device is simplified accordingly. Consequently, the operational function is accurate and, in particular, the mechanism of the device is operated easily from the outside utilizing an electromagnet, etc. and very effective when it is applied to the reproducing device for dictation recording.

Figure 4:
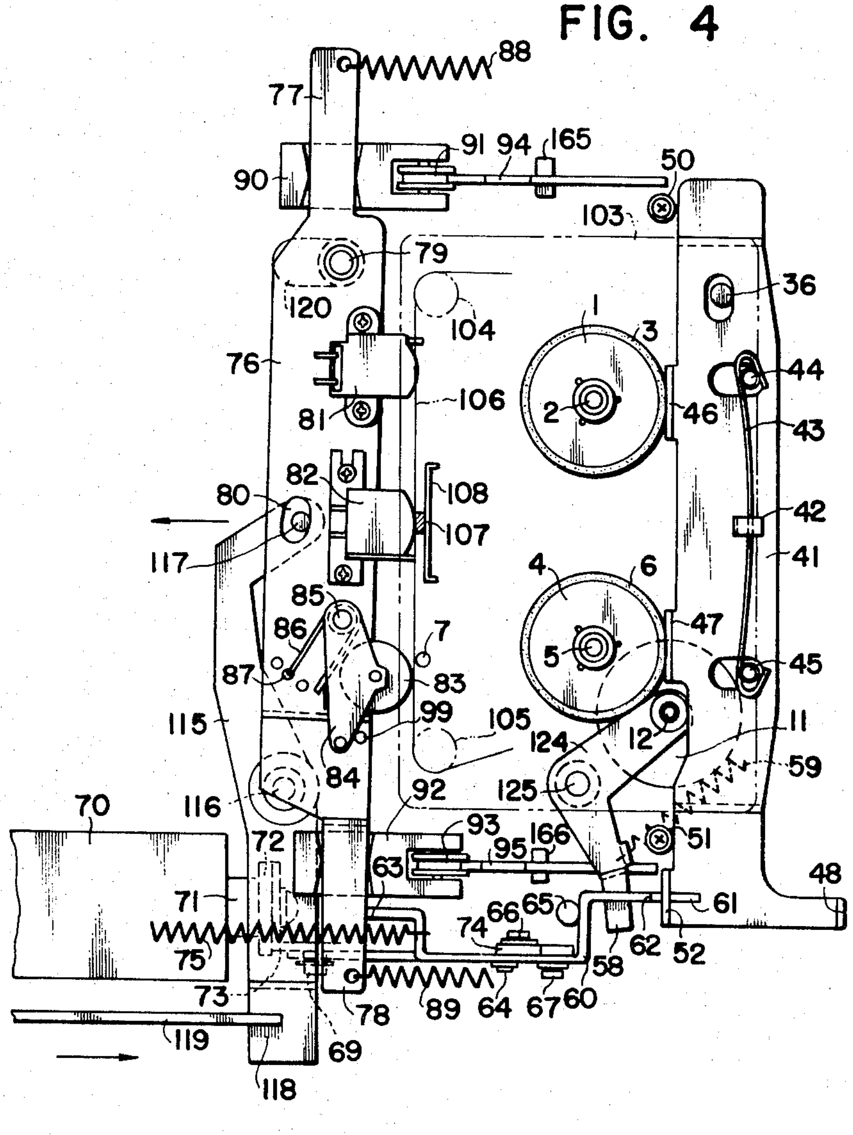
FIG. 4 shows an unplayed condition (the second condition) that the cassette is brought into playing position.
Figure 5:
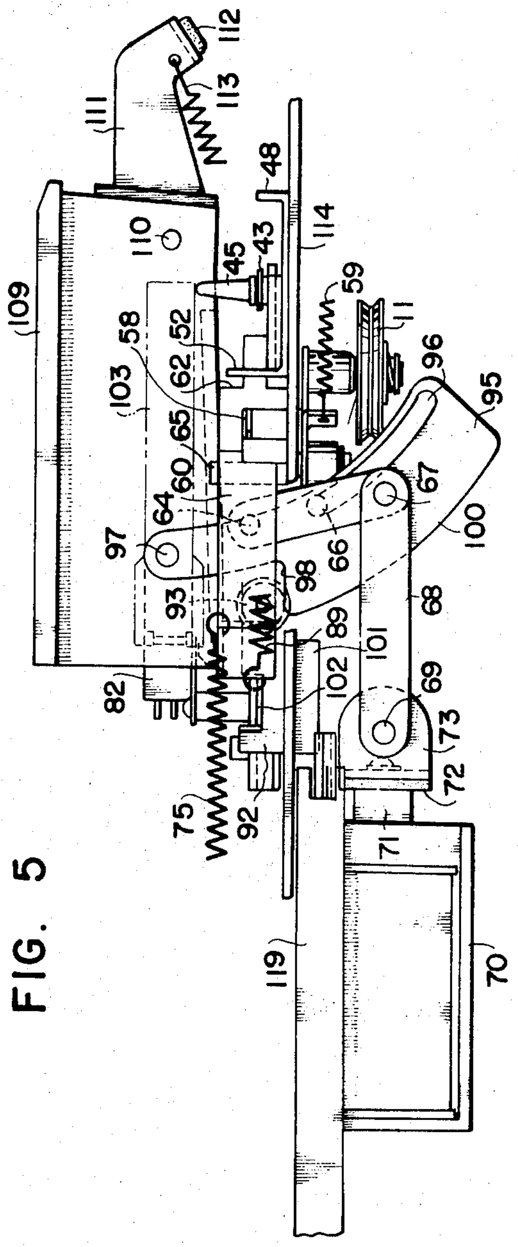
FIG. 5 is a side view illustrating the relation of the cassette holding case as a side view of FIG. 4.
Figure 6:
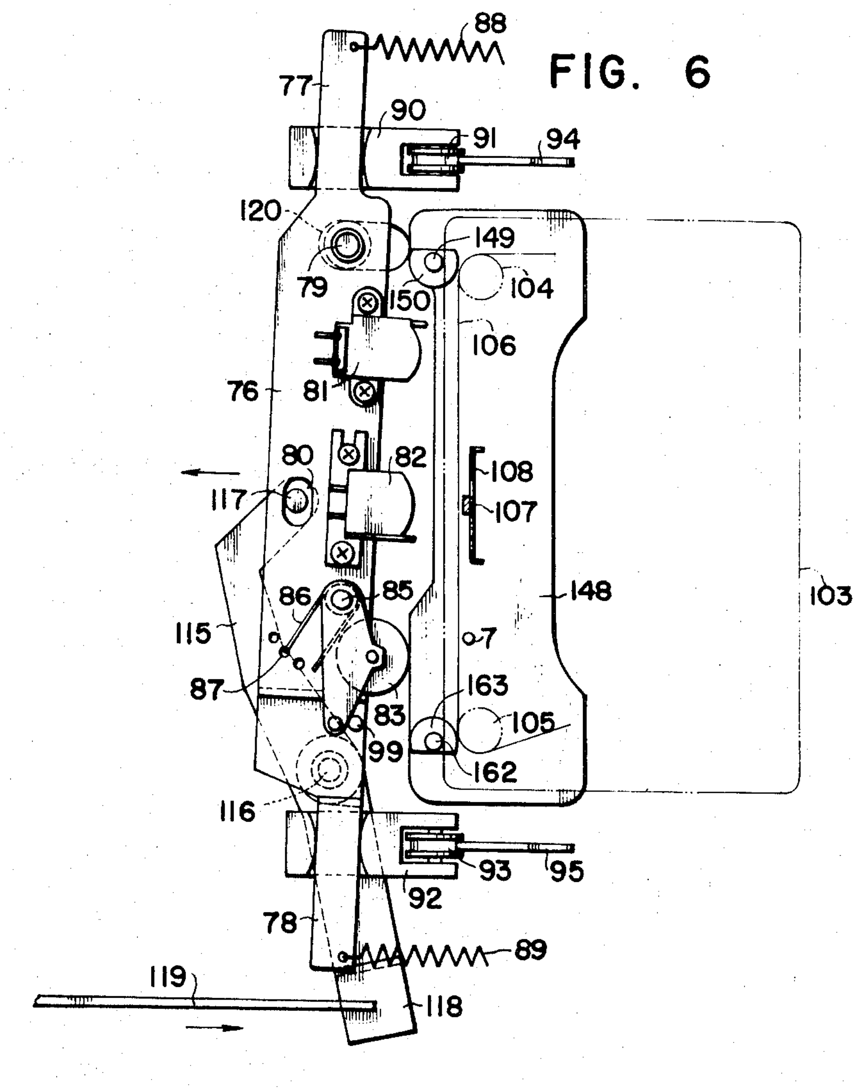
FIG. 6 is a plan view showing a popped-up condition (the first condition) of the cassette holding case.
Figure 7:
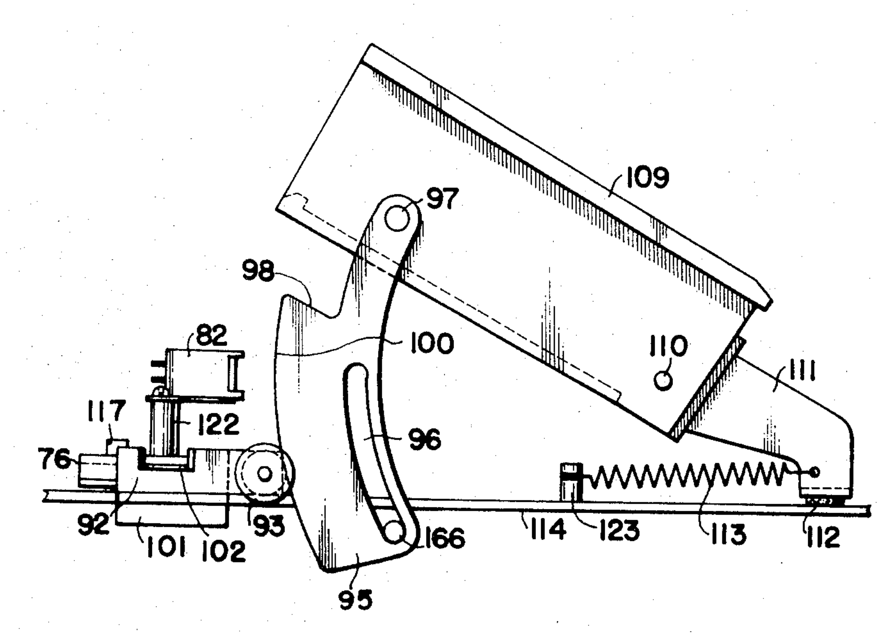
FIG. 7 is a side view of the cassette holding case shown in FIG. 6.
Figure 8:
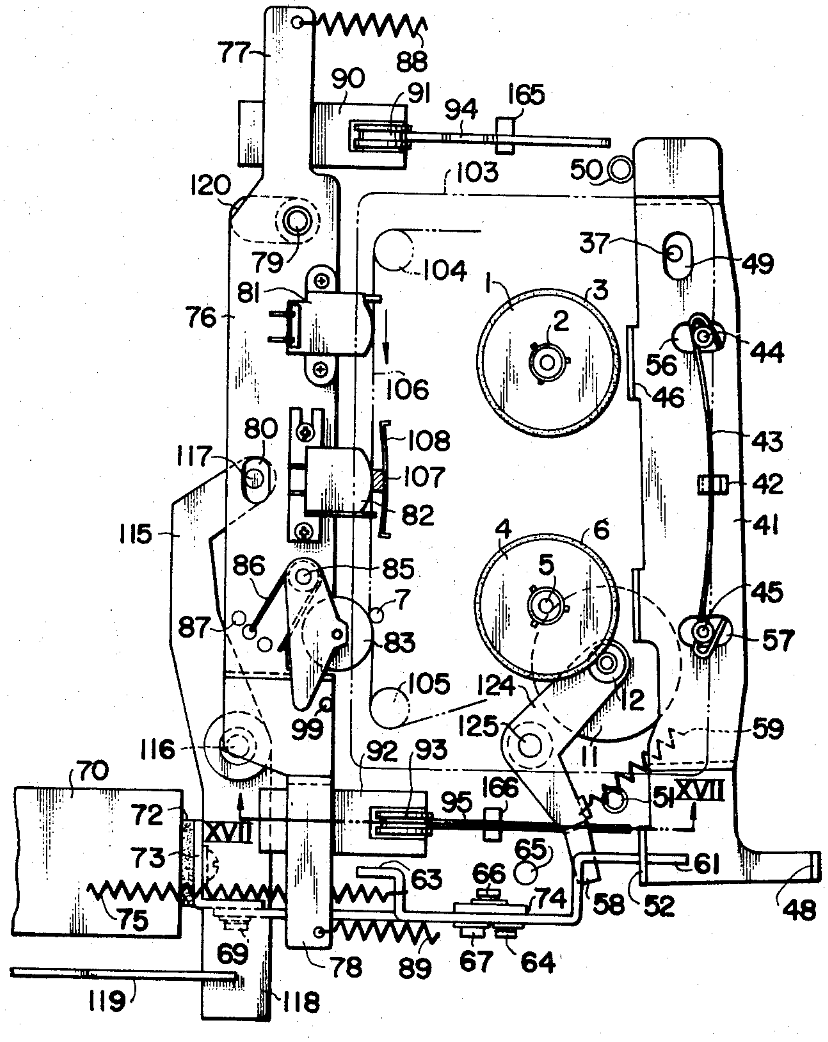
FIG. 8 is a plan view illustrating the recording or reproducing condition (the third condition)

Reference numeral 58 indicates one end of the holding lever 124 of pulleys 11 and 12. The lever 124 is supported by a shaft 125 provided on the base plate 114 (not shown in FIG. 4 for the sake of clarity) and urged by a spring 59 in order to be driven to press on the side of the takeup reel base 4. The lever 124 is fitted into a hole (not shown in the drawing) provided on the bent projection 52 of the brake arm by means of one end of a reproduction controlling rod 60 so as not to make contact with the take-up reel base 4 except when forwarded at constant speed in recording and reproducing. When the tape is forwarded from the supply reel base to the take-up reel base 4 at a constant speed in recording and reproducing, the stepped portion 62 of the reproduction controlling rod 60 presses and shifts the bent projection of the brake arm 41, thus releasing the brake. Simultaneously, the pulley 12 is released from its idle position and makes contact with the takeup reel base 4, thus transmitting the tape winding force to the takeup reel base 4. Reference numeral 63 indicates the other end of the reproduction controlling rod 60 which contacts with the other end 78 of a head base 76 by means of a spring 75 except when forwarded at a constant speed for recording and reproduction. The head base 76 is positioned as determined by means of the controlling rod 60 regulated by a pin 65. Reference numerals 88 and 89 are springs which act on both ends 77 and 78 of the head base 76 to always pull the head base 76 toward the side of the cassette 103, but the spring force of the spring 75 is greater than those of springs 88 and 89 and acts against them, thus rotating about the supporting axle 79 of the head base plate to maintain the position as shown in FIG. 4. Reference numeral 70 indicates an electromagnet for forwarding at a constant speed when the tape is recorded or reproduced. Reference numeral 71 is its plunger, 72 is a rubber washer for noise reduction, and 73 is a metal fixture for connection, the attracting force of the electromagnet 70 being transmitted to the controlling rod 60 through the rod 68 and the lever 74. Reference numerals 64, 67 and 69 indicate connecting pins, and 66 indicates a supporting shaft for rotating the lever 74 (FIG. 5). Reference numeral 120 indicates a slot provided in the base plate 114 in which the supporting shaft 79 of the head base plate can shift and rotate; at its first position the shaft 79 also recedes as shown in FIG. 6 because of the retreat of the head base 76. Reference numeral 81 is an erasing head, and 82 is a recording and reproducing head, both being fixed on the head base 76. Reference numeral 82 is a pinch roller, 84 is a lever holding the pinch roller, 85 is a supporting axle on which the pinch roller holding lever 84 rotates, and 86 is a spring for providing a spring force to the pinch roller. One end of the spring 86 engages the bent projection of the pinch roller holding lever 84 and the other end thereof engages with an engaging hole 87 provided in the head base 76. Reference numeral 99 indicates a pin with which the pinch roller holding lever 84 contacts. The pin 99 contacts with the pinch roller holding lever 84 except when the tape 106 is forwarded at a constant speed. Reference numerals 90 and 92 are pieces driving the head base 76. As shown in detail in FIGS. 17 and 18, the cut hollow portions 102 hold both ends 77 and 78 of the head base 76, and engage grooved rollers 91 and 93 and the head base controlling plates 94 and 95, respectively. Reference numeral 101 is a doubling plate of the head driving piece 92 and slides along the base plate 114 interposed therebetween. Reference numeral 167 is a screw for mounting the doubling plate 101 on the driving piece 92. The head base controlling plates 94 and 95 are connected at one end to a pin 97 provided on the side wall of the cassette holding case 109. A slot 96 is guided by guiding shafts 165 and 166, rotating and connecting operatingly about the axis 110 of the cassette holding case 109. The slot 96 and its outer edge 100 are formed concentrically with an axis 110 as the center so that the position of the head base does not shift during the rotation. Reference numeral 98 indicates a cut portion for engaging to advance the head base 76 in the playing position, this notched portion 98 also serves to lock the cassette holding case 109 in the playing position thereof. Reference numeral 103 indicates a cassette, and 104 and 105 are tape guide rollers inside the cassette 103. Reference numeral 107 indicates a pad for the recording and reproducing head, and is provided inside the cassette 103. Reference numeral 106 is a tape, and 108 is a spring plate for supporting the pad 107. Reference numeral 111 indicates a support of a spring 113 which also acts as a contact for controlling the angle of rotation. When the head base 76 recedes thereby disengaging the cut hollow portion 98 of the head base controlling plates 94 and 95 from the rollers 91 and 93 provided in the head base plate driving pieces, the cassette holding case 109 automatically rotates and the spring 113 helps to rotate the case 109 and makes it easy to take out the cassette. The portion 111 also controls the degree of rotation and contacts with the base plate 114 after rotating through a predetermined angle. Reference numeral 112 is a buffer which acts when contacted. Reference numeral 119 indicates an operating rod which draws the head base 76 back to pop up the cassette holding case 109 when the cassette 103 is taken out. The pressing operation of the rod 119 in the direction of the arrow rotates a lever 115 about a shaft 116 provided on the base plate 114 (not shown in FIG. 4 for the sake of clarity), and the pin 117 provided on the end of the lever 115 engages the slot 80 in the head base 76, thereby retreating the head base 76. Consequently, the erasing head 81 and the recording and reproducing head 82, pinch rollers 83, etc., are withdrawn from the cassette 103, and the rollers 91 and 93 also draw back so that the engagement of the head base controlling plates 94 and 95 is released and the cassette 103 pops up together with the cassette holding case 109 (FIGS. 6 and 7). Reference numeral 122 is a supporting column for the head. Reference numeral 118 is a contacting portion of the rod 119 for operating the lever 115, and 123 is a hanger of a spring 113. In the second position in FIG. 4, the fast forwarding and rewinding operation is obtained by the action of electromagnets 22 and 30, and the cassette 103 pops up by the operation of the operating rod 119. Also in this position, the rod 60 releases the engagement of the brake arm 41 with both reel bases 1 and 4 and, at the same time, disengages one end of the head base 76 by the action of the electromagnet 70. The head base 76 then rotates about the shaft 79 supporting the head base 76 with the aid of the spring 89. The recording and reproducing head 82 and the pinch roller 83 is further advanced inside the cassette 103 so that the pressure of the pad 107 is sufficiently applied to the recording and reproducing head 82 so as to permit accurate recording and reproducing. Simultaneously the winding force for winding the tape 106 forwarded by the capstan 7 and the pinch roller 83 is transmitted by pressing contact of the roller on the takeup reel base 4 (FIG. 8).

As stated above, the head base 76 is rotated about the shaft 79 of the head base provided adjacent to the erasing head 81 in order to obtain the second and the third positions, because the position of the erasing head 81 hardly needs to change. An erasing head base 151 is provided separately from the head base 76 as shown in FIG. 15, the slot 156 of the erasing head and the other slot 157 are arranged to engage with the pin 154 provided on the head base 76 and with the pin 153 provided on the base plate 114 (not shown in the drawing), respectively. On the rear end portion of the erasing head base 151 is provided a spring hanging portion 152. When a tension spring 155 is hung between this spring hanging portion 152 and the pin 154, the head base 76 advances from the first position separated from the tape 106 to the position shown by a solid line in FIG. 15 in parallel displacement so that the erasing head 81 contacts with the tape 106 to permit fast forwarding and unwinding of the tape and erasure while forwarding. Even when the head base 76 advances to the third position (shown by a two-dot chain line) for the recording and reproducing in further parallel displacement, the erasing head 81 can hold entirely the same position as the second position. That is to say, the erasing head base 151 is in contact with the pin 154 in the first position, and even when the force of the spring 155 acts, the erasing head base 151 maintains its position. However, if the head base 76 is advanced to the second position and takes the position shown by a solid line in FIG. 15, the erasing head base 151 also moves by that distance of the shift and stops after contacting with the pin 153. Since the pin 153 contacts with the slot 157 and the erasing head base 151 can not advance any more, the pin 154 advances only in the slot 156 even if the head base 76 is advanced further from this situation to the third position (shown by a two-dot chain line). Consequently, both the erasing head base 151 and the erasing head 81 do not advance and remain in the second position.

Figure 9:
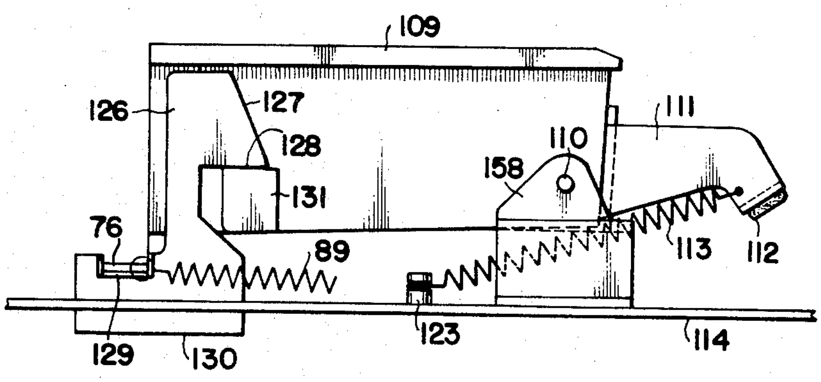
FIGS. 9 and 10 are side views illustrating another embodiment for controlling the head base by the cassette holding case.
Figure 10:
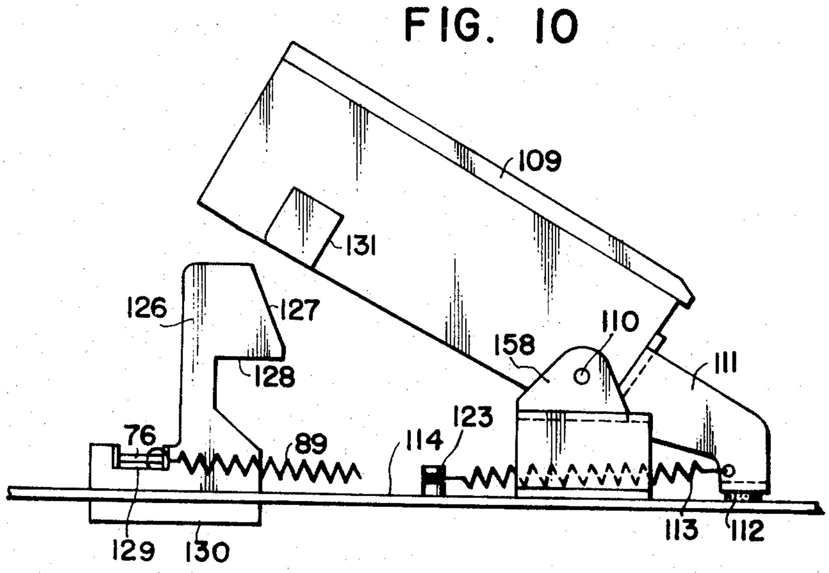

FIGS. 9 and 10 show another embodiment of this invention. A head base driving piece 126 engages with the head base 76 by means of a cut hollow portion 129. An inclined portion 127 and a cut portion 128 are arranged so as to engage with the projected portion 131 provided in the side face of the cassette holding case 109. When the cassette holding case 109 is brought from the popped-up position thereof to the playing position against the force of the spring 113, the lower edge of the projected portion 131 presses said inclined surface 127 so as to draw back the head base driving piece 126, thereby retracting the head, pinch roller, etc. When the cassette holding case 109 is brought to the playing position, the engagement thereof with the inclined portion 127 is released and the head base driving piece 126 is advanced into the cassette side with the aid of the spring 89 just as the projected portion 131 enters in the cut hollow portion 128. 158 is the bearing of a shaft 110 rotating the cassette holding case 109. When the cassette is taken out, the head base 76 is drawn back as in the former case and the locking engagement of the hollow portion 128 with the projected portion 131 is released, then, the cassette holding case 109 pops up by the action of a spring 113. Reference numeral 130 is a doubling plate for the head base driving piece 126.

Figure 11:
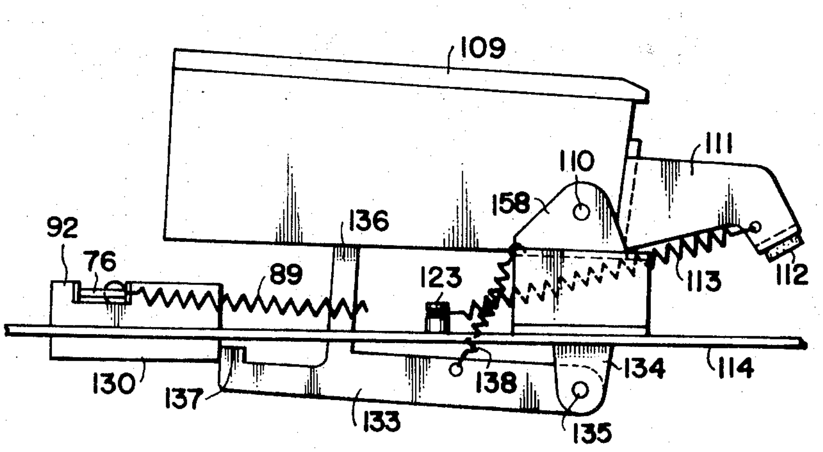
FIG. 11 is a side view illustrating still another embodiment for controlling the head base by the cassette holding face.

FIG. 11 shows still another embodiment of this invention. A lever 133 is provided for detecting that the cassette holding case 109 is brought into the playing position. One portion 136 of this lever 133 is pressed by the operation mounting the cassette holding case 109 to the playing position to shift downward the head base driving piece 92 and the projected portion 137 in contact with the doubling plate 130 to the cassette side of the head base 76 to release the engagement, and the head base 76 is permitted to advance in the cassette side by the action of the spring 89. In order to remove the cassette, the head base 76 is first drawn back, i.e., to the left-hand as viewed in FIG. 11, as described previously, thereby releasing the lever from engagement with the head base 76 and permitting the lever 133 to rotate clockwise by a biased force of the spring 138 and thereby causing the cassette holding case 109 to pop up forcibly by the rotation of the lever 133 and spring 113. Then the forward movement of the head base 76 is prevented by the lever 133. Reference numeral 134 is the bearing for the rotating shaft 135 of the lever 133.

If a switch is provided for making or breaking an electric circuit in connection with the withdrawing motion of the head base 76, the electric current is supplied only when the device is operated, thus preventing the consumption of the power source and wasteful wear of all rotating parts. Furthermore, if the head base immediately takes the abovementioned third position at the same time when the cassette has been set to the playing position, playing can start in a single mounting operation. This will contribute to the realization of an easily operable magnetic recording and reproducing apparatus.

FIGS. 12, 13 and 14 shows the cassette when it is held or released by the cassette holding case. Reference numeral 140 indicates an extruding rod freely slidable in the direction of inserting the cassette. The rod 140 slides in the guides 139 provided in the cassette holding case 109 through rollers 141 and 142, and always pressed forward by a spring 145 hung between the part thereof and the forward end projection 143 of the holding case 109, 144 is a plate spring fixed at one end onto the said extruding rod 140 and it presses the cassette 103 downward when the cassette 103 is inserted.

Reference numerals 146 and 164 are pawls for engaging the cassette and provided on the underside guide face of said holding case 109, and integrated with the holding case 109. Reference numeral 147 is a hole provided in the underside of the cassette holding case 109, and the reel base shafts 2 and 5 pierce through it. Reference numeral 148 is a doubling base plate and guide pins 149 and 162 are provided thereon, and on the base portion thereof are located large diameter portions 150 and 163. When the cassette 103 is inserted, it is pressed in against the force of the spring 145, accordingly, against the extruding force of the extruding rod 140 as shown in FIG. 12, thus the extruding rod also moves back. When the cassette is completely inserted, it falls down into the engaging portion of the pawl 146, 164 and engages therewith as shown in FIG. 13, since the cassette 103 is pressed downward by the plate spring 144. In this case, the cassette 103 will not be expelled by the extruding rod 140 even if the cassette 103 is free from manual contact. In this manner, the cassette 103 is first held in the cassette holding case 109, and then the holding case 109 is rotated about the axis 110 to bring it into playing position. That is to say, when the holding case 109 is rotated downward, the forward undersurface of the cassette 103 contacts with the upper end faces of the large diameter portions 150 and 163 of the guide pins 149 and 162, thus controlling the forward height of the cassette 103. When the holding case 109 is further slightly pushed from this position, the cassette 103 still holds the predetermined position by the aid of the large diameter portions 150 and 163 of the guide pins 149 and 162. However, the holding case rotates relative to the cassette 103 against the force of the plate spring 144; consequently, the pawl 146 engaging with the cassette 103 disengages the cassette 103 and the cassette 103 is pushed forward by the aid of the extruding rod 140 under the spring force 145 and comes in contact with the guide pin 149, the cassette 103 thus being controlled with respect to the front and rear faces and the height thereof in the playing position as shown in FIGS. 14 and 19. It is also to be added that the rear end of the cassette 103 is controlled by the height controlling pins 44 and 45, and for the holding case 109 the cut hollow portion 98 of the head base controlling plate 94 is engaged by locking with the roller 91 as a result of the advance of the head base 76. In such manner as described, the cassette 103 is brought into playing condition, and recording and reproduction are carried out (FIG. 14). On the other hand, the cassette 103 is removed by releasing the lock engagement of the holding case 109 under the condition that the cassette 103 is brought into playing position. By unlocking the holding case 109, the holding case pops up and returns to the position shown in FIG. 12 and the engagement of the front face of the cassette 103 with the guide pins 149 and 162 is released, thereby the cassette 103 being moved forward by the extruding rod 140 with the aid of the spring 145 to return to the initial position prior to the insertion into the holding case (FIG. 12). Reference numeral 132 is the bearing for the rotating shaft 110 of the cassette holding case 109 (FIGS. 12 to 14). When it is desired to take out the cassette 103 immediately after the cassette 103 was first engaged as shown in FIG. 13, it was necessary to ring down the cassette to the playing position as shown in FIG. 14, since there has been no way of releasing the engagement under the above condition in conventional devices. According to the present invention, however, pressing the underface of the cassette 103 with the finger tip is sufficient for releasing the engagement since the cassette 103 is engaged directly by the engaging pawls 146 and 164, thus providing much convenience.

What is claimed is:

1. A magnetic recording and reproducing apparatus for use with a tape cassette, comprising: a recording and reproducing head, an erasing head and a pinch roller; head shifting means for moving said recording and reproducing head between first, second and third positions, wherein in said first position said recording and reproducing head is disposed away from the tape of a cassette mounted in a playing position, in said second position said recording and reproducing head is advanced into the mounted cassette in contact with the tape of the mounted cassette, and in said third position said recording and reproducing head is further advanced into the mounted cassette to be in steady contact with the tape of the mounted cassette, and for moving said erasing head between two positions wherein in one position, corresponding to said first position, said erasing head is disposed away from the tape of the mounted cassette and in the other position, corresponding to said second position, said erasing head is in contact with said tape and means for moving said pinch roller to a position where said pinch roller presses the tape of the mounted casseete against a capstan when said recording and reproducing head is moved to said third position while maintaining said erasing head substantially in said other position, for driving the tape in a constant speed forwarding mode.

2. A magnetic recording and reproducing apparatus according to claim 1, further comprising: a movable head base on which said recording and reproducing head, said erasing head and said pinch roller are mounted; and means for slidably moving said head base to one of said first, second and third positions, wherein said means for slidably moving said head base comprises a shaft fixed to said head base and supported on said base plate, said shaft being movable between first and second positions, the second position of said shaft being closer to the mounted cassette than the first position of said shaft; means for moving said head base towards the mounted cassette to the second position of said shaft, said head base being thereby moved to said second position; and means for pivotally moving said head base about said shaft located at its second position, thereby moving said head base to said third position.

3. A magnetic recording and reproducing apparatus according to claim 1, further comprising: a movable head base on which said recording and reproducing head, said erasing head and said pinch roller are mounted; and means for slidably moving said head base to one of said first, second and third positions, wherein said means for slidably moving said head base comprises a head base driving piece mounted slidably on said base plate and mechanically engaged with said head base for moving said head base to change its position with its sliding movement, and means responsive to the mounting of the cassette in said playing position for moving said head base driving piece so as to cause said head base to move toward said third position when said cassette has been mounted in said playing position.

4. A magnetic recording and reproducing apparatus according to claim 3, further comprising spring means urging said head base towards said third position, means for restraining the movement of said head base against said spring means, and means for releasing said head base from said restraining means to thereby permit the movement of said head base to said third position by the effect of said spring means.

5. A magnetic recording and reproducing apparatus according to claim 3, further comprising mounting means for mounting said cassette in said playing position and engaging means movable between engaging and disengaging positions and urged towards said engaging position, said engaging means having a first portion which engages said head base at said engaging position, thereby restricting said head base to said first position and disengages at said disengaging position, thereby permitting said head base to move from said first position, said engaging means further having a second portion which is pushed by any one of said tape cassette and said mounting means thereof when said mounting means is at said mounting position, thereby moving said engaging means to said disengaging position.

6. A magnetic recording and reproducing apparatus according to claim 3, further comprising a first pin fixed to said head base and a second pin fixed to said base plate; wherein said erasing head is mounted on an erasing head base which is movably supported on said head base and said erasing head base has two portions, one of which is engageable with said first pin to define the position of said erasing head base corresponding to said first position of said head base, the other portion of which is engageable with said second pin for keeping said erasing head base at the same position when said head base is moved to the third position from the second position.

7. A magnetic recording and reproducing apparatus according to claim 3, further comprising means for restricting said head base to said first position and means for releasing said head base from said restriction when said tape cassette is mounted in said playing position to thereby permit said head base to move to said second position.

8. A magnetic recording and reproducing apparatus according to claim 7, wherein said apparatus further comprises a reproduction controlling rod having a portion engageable with said head base to restrict the movement of said head base from said second position to said third position, and means for releasing the engagement between said reproduction controlling rod and said head base, said means being operative responsive to the mounting operation of said mounting means.

9. A magnetic recording and reproducing apparatus according to claim 3, wherein said tape cassette is mounted to said playing position in a direction substantially perpendicular to the direction of movement of said head base plate.

10. A magnetic recording and reproducing apparatus according to claim 3, wherein said apparatus further comprises a spring means urging said head base towards said second position, and head base driving means interlinked with said head base and having an inclined portion, said inclined portion being engaged with a projection provided to said mounting means against said spring means during the mounting operation of said means to thereby move said head base towards said first position thereof so as to permit said tape cassette to be mounted to said playing position.

11. A magnetic recording and reproducing apparatus according to claim 10, wherein said inclined portion is disengaged from said projection when said tape cassette has been mounted at said playing position to thereby move said head base toward said third position by said spring means and said head base driving means further comprise a cut portion which is engageable with said mounting means when said mounting means is at said mounting position thereby to hold said cassette in said playing position.

12. A magnetic recording and reproducing apparatus according to claim 1, further comprising: a base plate; a head base movably mounted on said base plate, and supporting said recording and reproducing head, said erasing head and said pinch roller; mounting means supported on said base plate and movable between mounting and demounting positions for mounting and demounting a tape cassette at and from a playing position for recording and reproducing the tape thereof; a head base controlling plate interlinked with said mounting means, said head base controlling plate comprising an outer edge which is slidably engaged with said head base to prevent said head base from being moved from said first position when said mounting means is positioned at said demounting position, and a cut portion which is formed at one end of said outer edge to disengage said head base from said outer edge to thereby permit said head base to move towards said third position when said mounting means is positioned at said mounting position.

13. A magnetic recording and reproducing apparatus according to claim 1, further comprising: a movable head base on which said recording and reproducing head, said erasing head and said pinch roller are mounted; and means for slidably moving said head base to one of said first, second and third positions, wherein said means for slidably moving said head base comprises spring means urging said head base towards said third position and means engageable with said head base, for restricting the movement of said head base against the force of said spring means, said means engageable with said head base being disengaged from said head base when the cassette has been mounted on said apparatus in said playing position, whereby said head base is free to move to the third position.

14. A magnetic recording and reproducing apparatus according to claim 1, further comprising a base mounted on which said recording and reproducing head is mounted; and mounting means for mounting a tape cassette in a playing position wherein said mounting means is provided with a cassette holding case for holding a tape cassette therein, said cassette holding case comprising a space for holding the cassette, said space being defined by guides and engaging pawls provided on both sides of said guides, an opening for inserting the cassette into said holding space along said guides, a spring actuated rod adapted to be engaged with one edge of the inserted cassette mounted in said holding space towards said opening, said engaging pawls being adapted to be engaged with an edge of the inserted cassette opposite to said one edge in order to hold the inserted cassette within said space against the urging of said rod, a spring actuated means for urging said inserted cassette against said guides, thereby preventing said cassette from being disengaged from said engaging pawls, said cassette holding case being swingably supported on said base plate for the mounting and demounting operation of said cassette.

15. A magnetic recording and reproducing apparatus according to claim 14, further comprising means for releasing said cassette held in said space from engagement with said engaging pawls, said cassette being moved by the urging of said spring actuated rod at the end of the mounting operation of said cassette into said playing position and means for limiting the movement of said cassette thereby causing said cassette to be brought into said playing position.

16. A magnetic recording and reproducing apparatus according to claim 14, further comprising at least one guide pin having a vertically elongated surface to define a front face of said playing position and a horizontal surface to define a horizontal level of the same, said horizontal surface being abutted with the under side of said tape cassette to thereby position said tape cassette at said horizontal level and to release said tape cassette from engagement with said pawls responsive to the mounting operation of said mounting means, and said vertically elongated surface being abutted with the front face of said tape cassette when said tape cassette is released from engagement with said pawls and pushed towards said opening by said spring actuated rod.

17. A magnetic tape cassette recording and reproducing apparatus, comprising:

a base plate;

means for mounting a tape cassette on said apparatus in an operating position;

driving means for driving the tape in a mounted cassette at a first speed for recording and reproducing and at a second speed for fast winding and rewinding operation, selectively;

a capstan rotatably mounted on said base plate for engagement with the tape in said mounted cassette;

a movable head base on which are mounted a first recording and reproducing head, a second erasing head and a pinch roller, said head base being slidable toward and away from the tape in said mounted cassette;

means coupled to said mounting means for slidably moving said head base to one of first, second and third positions, wherein, in said first position, said first and second heads and said pinch roller are disposed away from the cassette operating position and out of contact with said tape to permit said cassette to be mounted therein by said mounting means, in said second position, said first and second heads are disposed in contact with the tape in said mounted cassette and said pinch roller is held out of engagement with said tape to permit said driving means to operate said tape at said second speed, and in said third position, said first and second heads are disposed in contact with said tape in said mounted cassette and said pinch roller engages said tape to press it against said capstan, said pinch roller and capstan cooperating to frictionally drive said tape in said mounted cassette; and first and second pins fixed to said head base;

wherein said erasing head is mounted on a mounting plate which is movably supported on said head base and said mounting plate has two portions, one of which is engageable with said first pin to define the position of said mounting plate corresponding to said first position of said head base, the other portion of which is engageable with said second pin for keeping said mounting plate at the same position when said head base is moved to the third position from the second position.

* * * * *